US005352051A

United States Patent [19]

Tamura et al.

[11] Patent Number: 5,352,051

[45] Date of Patent: * Oct. 4, 1994

[54] WRITING INSTRUMENT

[75] Inventors: Takashi Tamura; Masamitsu Nagahama; Koichi Enuma; Yoshihiro Wada; Masayuki Kawasaki; Kazuo Sakai; Kazunori Suzuki, all of Saitama, Japan

[73] Assignee: Pentel Kabushiki Kaisha, Tokyo, Japan

[ * ] Notice: The portion of the term of this patent subsequent to Jun. 8, 2010 has been disclaimed.

[21] Appl. No.: 945,402

[22] Filed: Sep. 16, 1992

Related U.S. Application Data

[63] Continuation of Ser. No. 678,322, Apr. 30, 1991, Pat. No. 5,217,313.

[30] Foreign Application Priority Data

| | | | |
|---|---|---|---|
| Sep. 29, 1989 | [JP] | Japan | 1-115051 |
| Sep. 30, 1989 | [JP] | Japan | 1-115437 |
| Nov. 30, 1989 | [JP] | Japan | 1-139439 |
| Dec. 27, 1989 | [JP] | Japan | 1-152382 |
| Apr. 28, 1990 | [JP] | Japan | 2-45989 |

[51] Int. Cl.[5] .......................... B43K 5/02; B43K 3/00; B43K 1/12; G01D 5/16

[52] U.S. Cl. ...................................... 401/48; 401/227; 401/198; 401/251; 401/258

[58] Field of Search ................ 401/198, 131, 48, 225, 401/227, 228, 229, 251, 243, 192, 205, 206, 219, 199, 202, 223, 258; 346/140 R, 140 A

[56] References Cited

U.S. PATENT DOCUMENTS

| | | | |
|---|---|---|---|
| 768,473 | 8/1904 | Manning | 346/140 A X |
| 4,671,692 | 6/1987 | Inaba | 401/209 X |
| 4,881,088 | 11/1989 | Fisher et al. | 346/140 R |
| 4,923,318 | 5/1990 | Rohrringer et al. | 401/225 |

*Primary Examiner*—Danton D. DeMille
*Attorney, Agent, or Firm*—Wenderoth, Lind & Ponack

[57] ABSTRACT

This invention relates to a writing instrument wherein a temporary ink storage member made of a synthetic resin injection molded article is sandwiched between a pen tip and an ink tank. In the present invention, a flange portion for fitting to a predetermined apparatus, which is positioned around an outer peripheral portion of the temporary ink storage member, is formed integrally with a shaft made of a synthetic resin injection molded article. In embodiments of the invention, the temporary ink storage member is made flexible, the shaft is made of a material which is softer than that of the tip holder, and the tip holder is used as a writing thickness display member. The temporary ink storage member can be used as an ink color display member and a cap is used as an application display member. In other embodiment, the cap can be fitted selectively in accordance with types of writing instruments.

9 Claims, 18 Drawing Sheets

WRITING INSTRUMENT

This is a continuing application of Ser. No. 07/678,322, filed Apr. 30, 1991, now U.S. Pat. No. 5,217,313.

TECHNICAL FIELD

This invention relates to a writing instrument produced by sandwiching a temporary ink storage member between a pen tip portion and an ink tank. A writing instrument which is used while fitted to an apparatus such as a plotter or in other words, a pen for an automatic drafting machine, is a particularly suitable example of the writing instrument of the present invention.

BACKGROUND ART

A large number of writing instruments which use a temporary ink storage member and which are generally referred to as an "ink-free type writing instrument" as typically represented by a fountain pen are known. The ink-free type writing instrument has a greater advantage in that the change of ink dischargeability is smaller until ink inside an ink tank is consumed fully, than those types of writing instruments in which an ink occluder is impregnated with ink to store it.

This advantage becomes a particularly great advantage for a pen for an automatic drafting machine. For, the density of a written line does not change much before and after replacement when ink is consumed fully and ink is replenished.

However, there are limitations peculiar to this type of pen for use an automatic drafting machine.

The first limitation resides in that a fitting portion for fitting the pen to the apparatus must be formed on the writing instrument. For this reason, an exclusive adaptor is used in most cases. In other words, a screw engagement portion is disposed in an adaptor having a flange portion for fitting to the apparatus and a screw engagement portion is disposed in a writing instrument main body, too, so that the adaptor and the writing instrument main body can be engaged with each other by these screw engagement portions. Alternatively, the adaptor itself consists of front and rear two members that can engage removably with each other and engagement of these front and rear members clamps and fixes the writing instrument main body.

The use of such an adaptor is not advantageous from the aspect of the following second limitation.

The second limitation is that alignment between the pen tip and the fitting portion of the pen for an automatic drafting machine for fitting the pen to the apparatus must be extremely high. If this alignment is not sufficiently high, the written line will deviate when the pen is replaced during drawing or if concentric circles are drawn in different colors, their alignment cannot be satisfied fully. In this sense, the use of the adaptor invites 10 dimensional variance and deteriorates alignment as much as the combined number of components.

One of the means which satisfy simultaneously the first and second limitations is to make the fitting portion integral with the writing instrument main body. As a matter of fact, some of the writing instruments of the type wherein the ink occluder is impregnated with ink and stores it have a flange portion for the apparatus which is molded integrally with a shaft by injection molding.

However, integral molding of the fitting flange portion with the shaft cannot be used directly for the ink-free type writing instruments.

For, the pen for an automatic drafting machine must have excellent vibration resistance as the third limitation. To satisfy this requirement, dimensional accuracy of the temporary ink storage member must be sufficiently high and in order to let the temporary ink storage member exhibit fully its functions, its dimensional accuracy must be sufficiently high, as well. As is known well, the temporary ink storage member plays the function of storing temporarily excess ink by capillary force in order to prevent the excess ink from being supplied to the pen tip and from causing ink leakage when an internal pressure of an ink tank rises, the function of moving the stored ink back into the ink tank more preferentially when the internal pressure of the ink tank drops and the function of sending smoothly the air into the ink tank without increasing the drop of the internal pressure when the ink is not stored. In order for these functions to be fully provided, dimensional accuracy of each portion such as a portion for storing temporarily the ink must be sufficiently high and even when each component is disposed inside the shaft, this high dimensional accuracy must be maintained sufficiently. However, vibration resistance described above is one of the factors which impede the functions of the temporary ink storage member. Therefore, dimensional accuracy must be kept particularly high. Integral molding of the flange portion with the shaft must not impede dimensional accuracy of the temporary ink storage member and if possible, integral molding is expected to contribute rather to the achievement of the various functions of the temporary ink storage member described above.

The fourth limitation is that the writing 10 instrument must be produced often in an extremely great number of product groups. The writing thickness range from a small thickness to a large thickness and the number of colors of ink is great, too, such as black, red, blue, green, orange, yellow, brown, and so forth. Furthermore, writing surfaces are diversified such as vellum paper, film, and so forth; hence, requirements from the aspect of application are diversified. When these requirements are combined with one another, the number of kinds of products may become some dozens of kinds or more.

The fourth limitation described above brings forth in turn the fifth and sixth limitations. In other words, the fifth limitation is that the writing instruments must be produced efficiently, though the number of their kinds is great. The sixth limitation is that each kind of product must be identified easily when it is used.

DISCLOSURE OF THE INVENTION

It is an object of the present invention to provide a writing instrument including a fitting flange portion for an apparatus molded integrally with a shaft, which solves all the problems with the prior art technique described above, satisfies sufficiently the requirement of alignment between a pen tip and a fitting portion for an apparatus and can fulfill fully the function of a temporary ink storage member.

It is another object of the present invention to provide a writing instrument which can be produced efficiently when the writing instruments are offered as product groups of many kinds.

It is still another object of the present invention to provide a writing instrument which, though made available in product groups of many kinds as described above, can be visually identified easily as to its kind.

These and other objects of the present invention will become more apparent from the following description.

The gist of the present invention is as follows.

(i) A writing instrument having a temporary ink storage member which is composed of a synthetic resin injection molded article and is sandwiched between a pen tip and an ink tank, characterized in that the shaft has as integral a flange portion made of a synthetic resin injection molded article and this flange portion is positioned around an outer peripheral portion of the temporary ink storage member.

(ii) A writing instrument having a temporary ink storage member which is a synthetic resin injection molded article and is fitted to a shaft in such a manner as to be sandwiched between a pen tip and an ink tank, characterized in that the shaft has a small diameter inner hole portion and a step portion at the back of this small diameter inner hole portion, a ring-like elastic member is fitted to the rear end portion of the temporary ink storage member, and this ring-like elastic member is stored in the small diameter inner hole portion of the shaft in a close contact and deformed state toward the inside and is brought into elastic contact with the step portion.

(iii) A writing instrument having a tip holder which is a synthetic resin injection molded article for fixing a pen tip so as to project therefrom and fitted and fixed to a shaft which is a synthetic resin injection molded article and having also a temporary ink storage member which is a synthetic resin injection molded article and sandwiched between the pen tip and an ink tank, characterized in that the shaft has an integral a flange an open portion whose inner wall is used as fitting-fixing portion for the tip holder, and the shaft is made of a synthetic resin which is softer than the tip holder.

(iv) A writing instrument having a main body formed by sandwiching a temporary ink storage member between a pen tip fixed to the tip of a shaft so as to project therefrom through a tip holder and an ink tank, and a cap fitted removably to the main body, characterized in that the tip holder is used as a writing thickness display member, the temporary ink storage member is used as an ink color display member, the shaft is transparent so that these displays can be seen therethrough, the cap leaves the tip holder and the temporary ink storage member exposed even when the cap is fitted, and this cap is used as an application display member.

(v) A writing instrument having a main body formed by sandwiching a temporary ink storage member between a pen tip fixed to the tip of a shaft so as to project therefrom through a tip holder and an ink tank, and a cap fitted removably to the main body, characterized in that the shaft and the temporary ink storage member are a synthetic resin injection molded article and are used as common components for each kind of products, and the cap can be fitted selectively to the main body in accordance with each kind.

BRIEF DESCRIPTION OF DRAWINGS

FIGS. 5 to 30 show components of the writing instrument shown in FIG. 1, respectively, wherein:

FIG. 5 is a partial exploded longitudinal sectional view of a shaft;

FIG. 6 is a transverse sectional view taken along line 6—6 of FIG. 5;

FIG. 7 is a longitudinal sectional view of principal portions and shows another example of a flange portion;

FIG. 8 is a longitudinal section view of principal portions and shows still another example of the flange portion;

FIG. 9 is a side view of a thin rod member;

FIG. 10 is a side view of the thin rod member when it is rotated by 90° from FIG. 9;

FIG. 11 is a front view of an example of a discharge port pattern of a nozzle used for obtaining the thin rod member;

FIG. 12 is a front view of another example of the discharge port pattern of the nozzle;

FIG. 13 is a front view of still another example of the discharge port pattern of the nozzle;

FIG. 14 is a longitudinal sectional view of a tip holder;

FIG. 15 is a front view of FIG. 14;

FIG. 16 is a transverse sectional view taken along line 16—16 of FIG. 14;

FIG. 17 is a transverse sectional view taken along line 17—17 of FIG. 14;

FIG. 18 is an enlarged view of a XVIII portion of FIG. 1 and shows the fitting state between the shaft and the tip holder;

FIG. 19 is a longitudinal sectional view of a temporary ink storage member;

FIG. 20 is a transverse sectional view taken along line 20—20 of FIG. 19;

FIG. 21 is an enlarged view of a XXI portion 21 of FIG. 1 and shows the clearance state between an inner wall of the shaft and the temporary ink storage member;

FIG. 22 is a view corresponding to FIG. 21 and shows the clearance state between the inner wall of the shaft and the temporary ink storage member;

FIG. 23 is an enlarged view of a XXIII portion 23 of FIG. 1 and shows the disposition state of a ring-like elastic member;

FIG. 24 is a view corresponding to FIG. 23 and shows another example of the disposition state of the ring-like elastic member;

FIG. 25 is a view corresponding to FIG. 23 and shows still another example of the disposition state of the ring-like elastic member;

FIG. 26 is a side view of an ink guide core member;

FIG. 27 is a partially exploded longitudinal sectional view of a tail plug;

FIG. 28 is a longitudinal sectional view of the state before the tail plug is fixed to the shaft;

FIG. 29 is a longitudinal sectional view of the state after the tail plug is fixed to the shaft;

FIG. 30 is a partial longitudinal sectional view of a cap;

FIGS. 32 to 34 are sectional views showing components shown in FIG. 31, respectively, wherein:

FIG. 32 is a longitudinal sectional view of a tip holder;

FIG. 33 is a longitudinal sectional view of a needle body shaped article;

FIG. 34 is a side view of a coil spring;

BEST MODE FOR CARRYING OUT THE INVENTION

Figure 1:
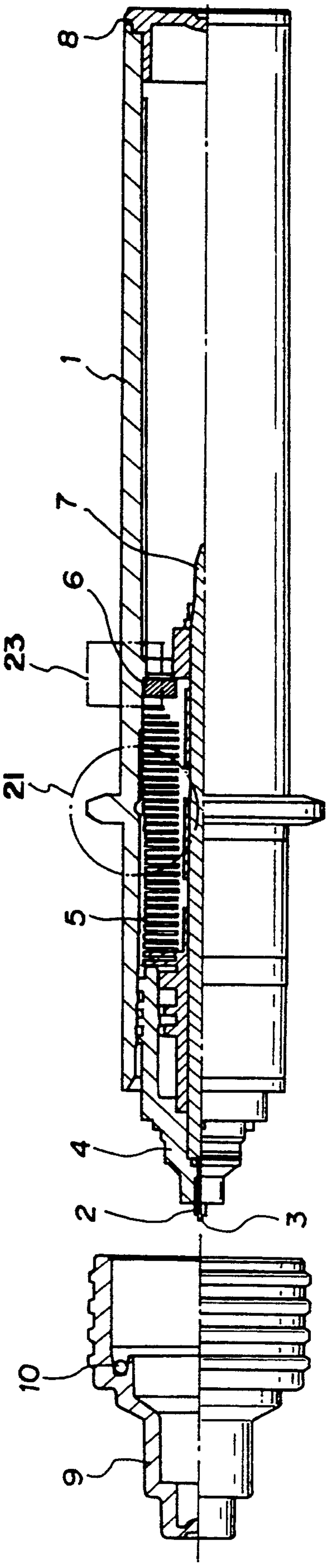
FIG. 1 is a partial exploded longitudinal sectional view showing an embodiment of a writing instrument in accordance with the present invention.

A writing instrument shown in FIG. 1 has ten members, that is, a shaft 1, a small diameter pipe pen tip 2, a thin rod member 3, a tip holder 4, a temporary ink storage member 5, a ring-like elastic member 6, an ink guide core member 7, a tail plug 8, a cap main body 9 and a ring-like seal member 10. The eight members ranging from the shaft 1 to the tail plug 8 constitute the main body and the cap main body 9 and the ring-like seal member 10 together constitute the cap.

This writing instrument represents an example of an ink-free type writing instrument. Unlike an ordinary writing instrument which is used while being gripped by a hand such as a fountain pen, however, this writing instrument has a flange portion 1*a* on the shaft 1. In other words, this writing instrument is also an example of a pen for an automatic drafting machine wherein a flange portion for fitting to an apparatus is formed integrally with the shaft and which is described already.

Figure 2:
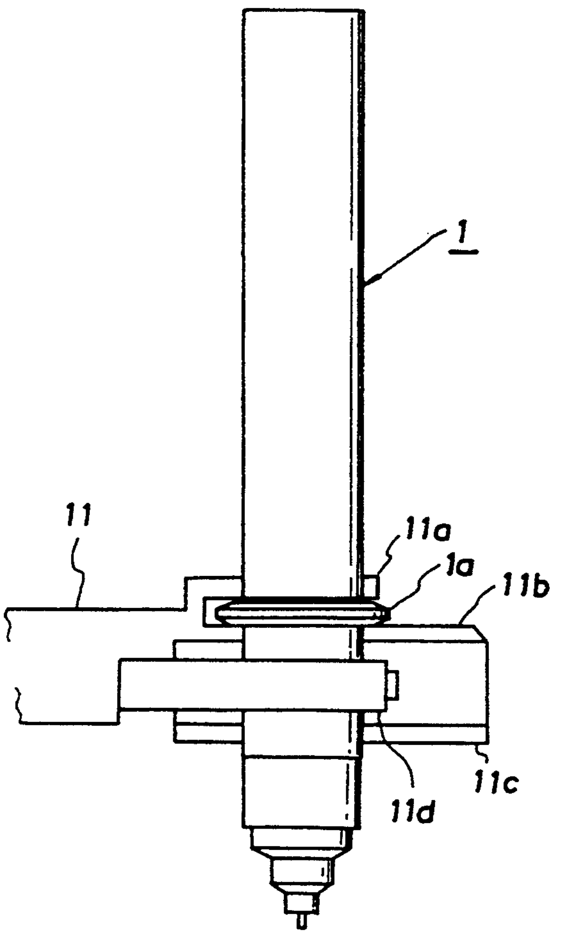
FIG. 2 is a side view of principal portions and shows an example of the writing instrument of FIG. 1 which is fitted to an apparatus.
Figure 3:
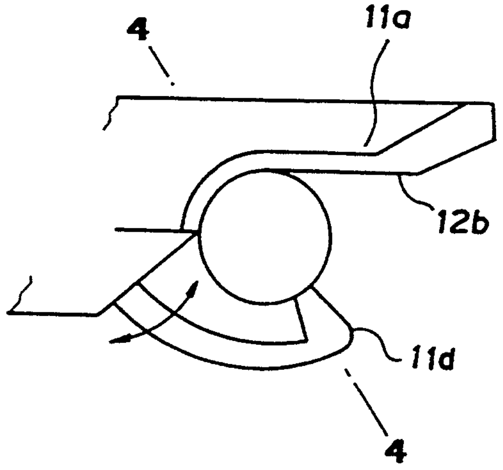
FIG. 3 is a top view of FIG. 2.
Figure 4:
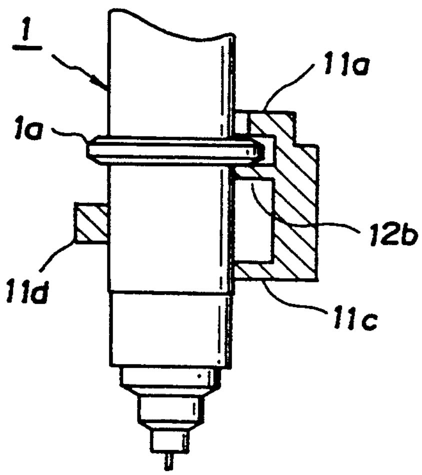
FIG. 4 is an exploded partial sectional view taken along line 4—4 of FIG. 3.

Now, the mode of use of the pen for such an automatic drafting machine (hereinafter called merely the "pen") will be first explained with reference to FIGS. 2 to 4 prior to the explanation of each portion.

Reference numeral 11 designates a pen fitting portion of an apparatus main body. Though various fitting structures are known for the pen fitting portion, the fitting portion shown in the drawings is an ordinary type having four pawls 11*a*, 11*b*, 11*c* and 11*d*. These pawls 11*a*, 11*b*, 11*c* are integral and the thickness of the flange portion 1*a* (the thickness in a vertical direction in FIG. 2) is substantially equal to the gap between the pawls 11*a* and 11*b*. Movement of the pen in the vertical direction is limited when the flange portion 1*a* is inserted between these pawls 11*a* and 11*b*. The pawl 11*d* is movable, clamps the pen between it and the pawls 11*b*, 11*c* and restricts transverse shake of the pen. The pen is used while it is fixed to the fitting portion 11 and the fitting portion 11 is moved up and down accurately with respect to a writing surface.

As can be understood from the explanation given above, it is also very important that the pen should be fitted and fixed to the apparatus so that it does not shanke and that the shapes and dimensions of a plurality of pens are identical and they can be fixed similarly.

Next, each portion will be explained.

Figure 5:
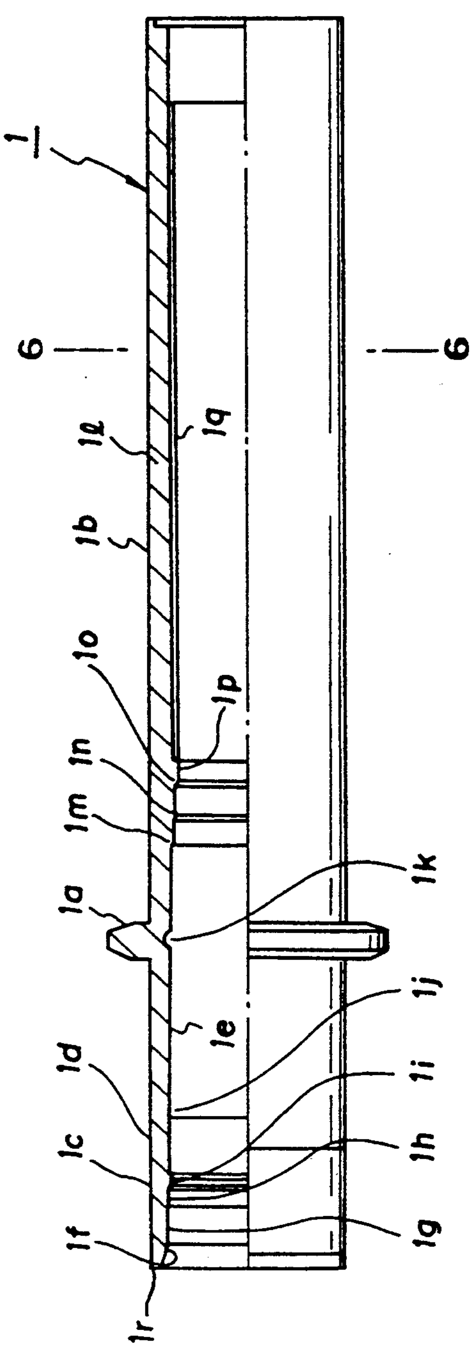
Figure 6:
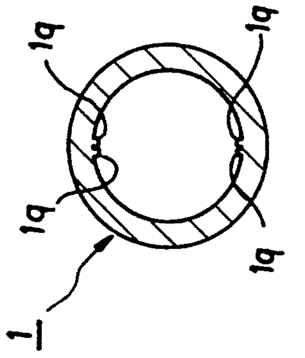
Figure 7:
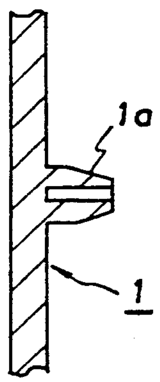
Figure 8:
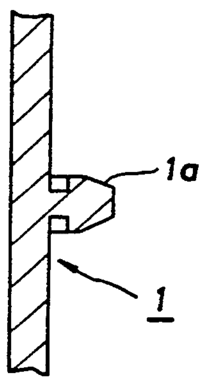

As shown in FIG. 5, the shaft 1 has a shape of a cylinder whose both ends are open. A step portion 1*d* having a tip portion 1*c* as a reduced diameter portion is formed on an outer wall 1*b* and a flange portion 1*a* is formed to the rear of this step portion 1*c*. As will be explained later in further detail, the reason why such an arrangement is employed is that the portion of the outer wall 1*b* in front and in back of the flange portion 1*a* is the one which faces the pawl 11*a* or the like, and the shape and dimension of this portion must be particularly accurate. Incidentally, the flange portion 1*a* is shown having a pentagonal longitudinal sectional shape having two parallel sides, but it may have a shape which can undergo easily elastic deformation such as the one shown in FIG. 7 or 8 so that it can exhibit a certain flexibility when inserted into the pawls 11*b* and 11*c*. A foremost tip portion 1*f* which expands in taper form, three ring-like inner projection portions 1*g*, 1*h*, 1*i*, a step portion 1*j*, a recess portion 1*k* positioned at the flange portion 1*a*, two step portions, 1*m*, 1*n* forming at the rear portion of the inner wall 1*e* a reduced diameter portion, a ring-like inner projection portion 1*p* having a front portion which becomes a step portion 1*o* at the back of the step portion 1*n* and a rib 1*q* which extends from the back of the inner projection portion 1*p* to the portion near the rear end of the inner wall 1*e* are formed sequentially on the inner wall 1*e* in the order named starting at the front. Here, the innermost tip portion 1*f* makes insertion of the tip holder 4 easy, reduces the thickness of the tip portion 1*r* of the wall 1*c* and prevents this tip portion 1*r* from coming unnecessarily into contact with the portions inside the cap main body 9 other than the ring-like seal member 10. The step portion 1*j* cuts off and checks ink when ink leaks accidentally from the front part along the inner wall 1*e*. The rear portion 1*l* functions as an ink tank. The rib 1*q* permits smooth forward movement of ink and the rib 1*q* shown in FIG. 6 has two slits formed therein. The rest of the portions will be described later.

Each member is disposed either directly or indirectly in this shaft 1 to form the main body. Hereinafter, the components will be explained in the order of increasing remoteness from the tip end.

The small pipe pen tip 2 is made of a rigid material such as a ceramic or stainless steel. An abrasion-resistant film is sometimes formed on the surface or an abrasion-resistant member is sometimes fitted to the tip. To prevent catching of the pen tip 2 in the writing surface, the tip is rounded suitably at its corners. If it has a symmetric shape in the longitudinal direction, it can be fitted more easily to the tip holder 4.

Figure 9:
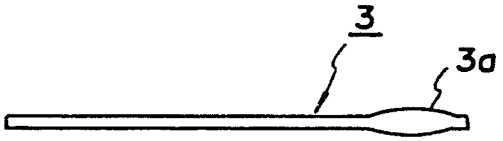
Figure 10:
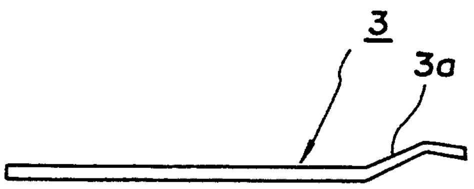
Figure 11:
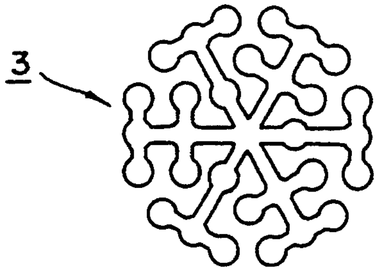
Figure 12:
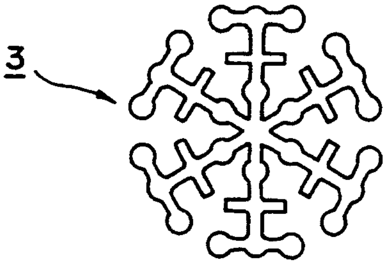
Figure 13:
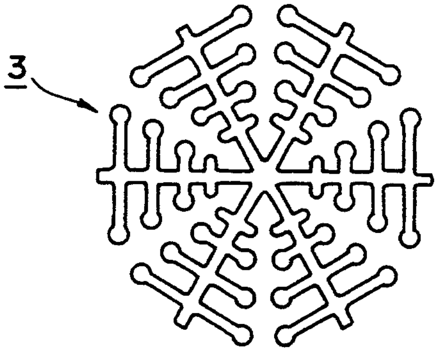

As shown in FIGS. 9 and 10, the rear part 3*a* of the thin rod member 3 is formed as an elastic crank portion so that the tip of the thin rod member 3 projecting slightly from the small pipe pen tip 1 can move back and forth. As shown in these drawings, the rear part 3*a* is made flat and can be shaped easily by a press or the like. In an assembled state where the rear part 3*a* is supported by the front end surface of the ink guide core member 7, it is disposed in a somewhat deformed state so that it exhibits some elasticity at the time of non-writing, too. Such a thin rod member 3 can be obtained easily by extrusion molding of a synthetic resin, for example. FIGS. 11 to 13 show some examples of discharge port patterns of a nozzle used for extrusion molding. If the thin rod member 3 is relatively thick for writing of characters having a relatively large thickness, the pattern is preferably complicated so as to cope with such a thickness.

Figure 14:
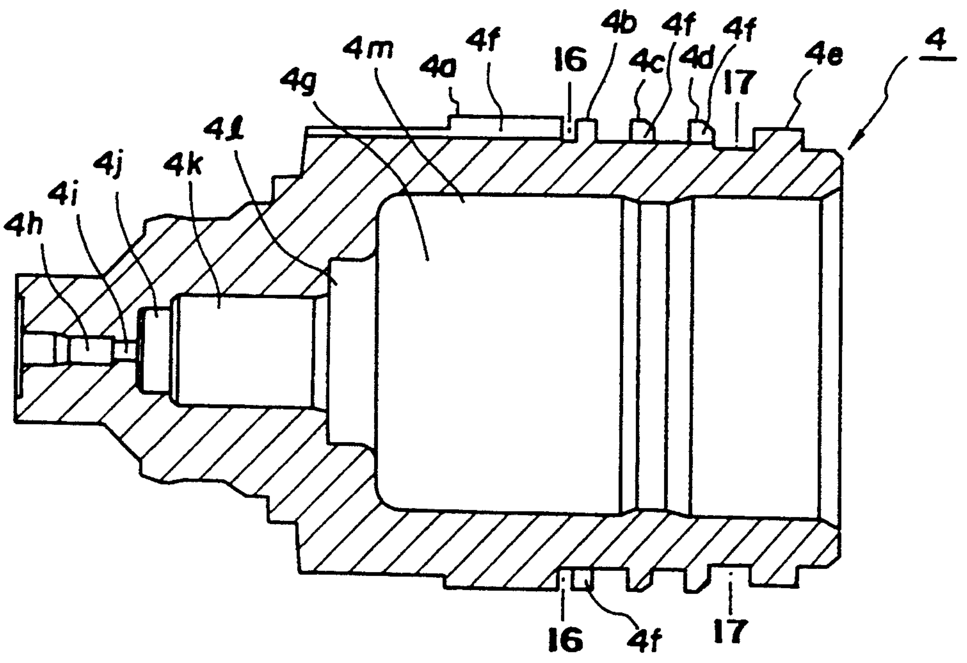
Figure 15:
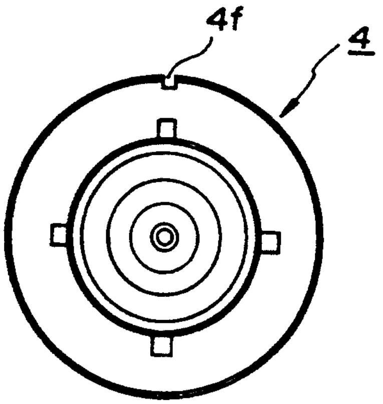
Figure 16:
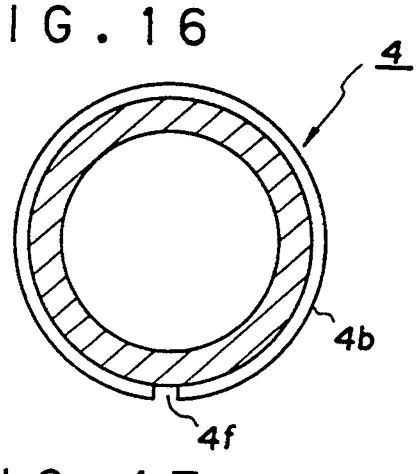
Figure 17:
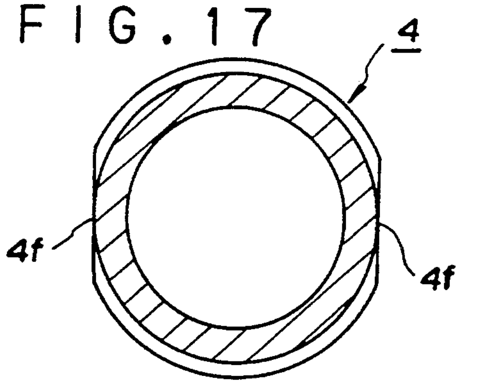
Figure 18:
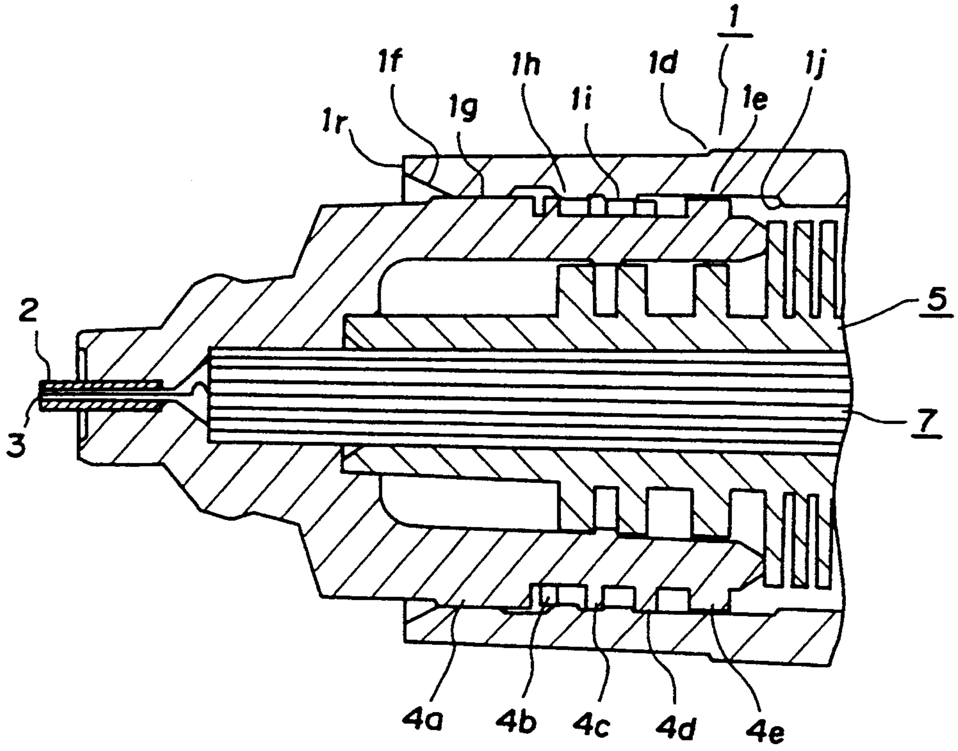

As shown in FIG. 14, the tip holder 4 has five flange-like portions 4*a*, 4*b*, 4*c*, 4*d*, 4*e* on its outer wall portion. These portions 4*a*, 4*b*, 4*c*, 4*d*, 4*e* have gaps which define an air passage 4*f*. FIGS. 16 and 17 show the air passage 4*f* at the portions 4*b* and 4*e*. These portions 4*a*, 4*b*, 4*c*, 4*d*, 4*e* contribute also to fitting and fixing the holder 4 to the inner wall 1*e* of the shaft 1. As shown in FIG. 18, the portion 4*a* and the inner projection portion 1*g* serve as a press fitting portion and the portions 4*b*, 4*c*, 4*d* and the inner projection portions 1*b*, 1*i* serve as concavo-convex fitting portions. The portion 4*e* serves as a guide when the tip holder 4 is fitted into the shaft 1 for these fitting and fixing operations. Since the fit-fixing portions are elongated as a whole, the degree of coincidence between the shaft 1 and the tip holder 4 in their axial directions becomes high. It is desired, however, that when the fit-fixing portions are thus elongated as a whole, the fitting force at a relatively rear portion will not be very strong. This is because the fitting a force functions as force that causes outward deformation of the shaft 1 and if this fitting force is strong at the rear part, an intended dimensional accuracy of the shaft 1 will be adversely affected. Such fitting can be accomplished by press-in fitting alone, for example. However, if fitting between the swell portion 4a at a relatively forward portion and the inner projection portion 1g is attained by press fitting which sufficiently restricts transverse shaking and if fitting between the portions 4b, 4c, 4d at relatively rear portions and the inner projection portions 1h, 1i is attained by means of engagement of concavities and convexities as shown in the drawing, concavo-convex fitting has small force of deforming outward the shaft 1 and hence, the position of the tip holder 4 with respect to the shaft 1 can be made reliable in the longitudinal direction even when the fitting force is small. Further, the fitting area between the portion 4a and the inner projection portion 1g is made relatively wide as shown in the drawing. Since fitting force per unit area can be made thus small though the overall fitting force is great, the deformation force on the shaft 1 does not become very great and fitting and fixing can be made uniformly as a whole. If alignment between the shaft 1 and the tip holder 4 is thus improved, deformability applied to the shaft 1 becomes desirably uniform.

The shaft 1 is equipped with the step portion 1d in back of the portion which receives deformation due to fitting and fixing described above. In other words, the outer diameter of the shaft 1 is reduced at the fit-fixing portion. This is extremely preferable in order to prevent the influences from any shaft deformation from acting on the flange portion 1a.

Turning back again to FIG. 14, the tip holder 4 has a through-hole 4g. Reference numerals 4h, 4i, 4j, 4k, 4l and 4m are provided in the order recited rearwardly from the front portion. Reference numeral 4h designates the fitting portion for the small pipe pen tip 2; 4i designates the portion through which the thin rod member 3 passes; 4j designates an ink reservoir portion at which the rear part 3a of the thin rod member 3 is positioned; 4k designates the portion into which the tip of the ink guide core member 7 is inserted; 4l designates the portion into which the tip of the temporary ink reservoir member 5 is inserted; and 4m designate the fixing portion for the temporary ink reservoir member 5. The fixing portion 4m is also an ink reservoir portion used when ink accidentally leaks forward while running through the temporary ink reservoir member 5.

As described above, the tip holder 4 fixes the small pipe pen tip 2 so as project therefrom and must have sufficient rigidity; otherwise the small pipe pen tip 2 becomes unstable due to a writing pressure or to resistance from the writing surface. To cope with this problem, the tip holder 4 is made preferably of a relatively hard material. If the tip holder 4 is made of such a hard material, the shaft 1 is made preferably of a relatively soft material. For, variations in fitting-fixing force between the shaft 1 and the tip holder 4 can be limited when a plurality of products are produced. According to this arrangement, deformation of the shaft 1 due to the tip holder 4 becomes great, it is true, but consideration of the deformation of the shaft 1 is sufficient as described already.

Both the shaft 1 and the tip holder 4 are composed preferably of a synthetic resin injection molded article because of easy moldability. To satisfy further the relation described above, an example of a suitable combination of materials consists of polypropylene for the shaft 1 and polyacetal for the tip holder 4.

Figure 19:
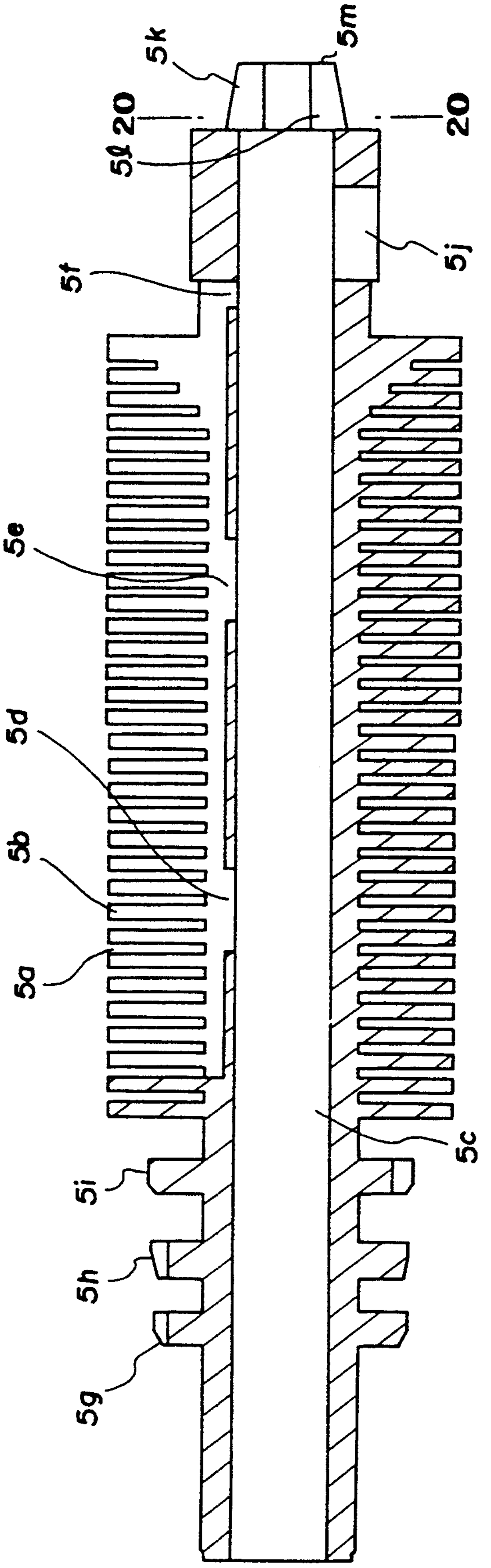

Next, the temporary ink storage member 5 shown in FIG. 19 will be explained. This ink storage member 5 includes temporary ink storage grooves 5a in a comb-tooth-like longitudinal section, slits 5b communicating with this temporary ink storage groove 5a, a center hole 5c into which the ink guide member 7 is fitted and communication openings 5d, 5e, 5f between the slits 5b and the center hole 5c. However, the temporary ink storage member itself is well known in the art and the explanation of its fundamental function will be omitted.

Figure 20:
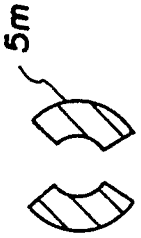

Ring-like portions 5g, 5h, 5i for fitting to the tip holder 4 are disposed at the front part of the temporary ink storage member 5. A groove which vents air at the time of fitting and which permits the passage of ink in case of emergency is formed as the air passage 5f. A through-hole 5j and a fixing portion 5k for the ink guide core member 7 are formed at the rear part of the temporary ink storage member 5. The throughhole 5j makes the movement of air to the ink tank smooth. Though its forward end is shown positioned at the rear end of the communication portion 5f, it may be disposed more rearward. The fixing portion 5k receives the ink guide core member 7 at the step portion 5l at the tip and serves as a heat-fusing portion for the ink guide core member 7 at its rear part 5m, whenever necessary. The rear part 5m is circumferentially interrupted as shown in FIG. 20 in order not to prevent the movement of air.

The temporary ink storage member 5 is fitted in the shaft 1. The flange portion 1a is formed at the outer peripheral position in this fitting state. The position of the flange portion 1a itself is arbitrary. However, the portions near the flange portion 1a must have particularly high dimensional accuracy as described already and must satisfy this requirement. Accordingly, the present invention contemplates to make the most of this dimensional accuracy in order to let the temporary ink storage member 5 exhibit its functions fully.

In other words, the temporary ink storage member, too, must be molded highly dimensionally accurately throughout its length including its portion for temporarily storing ink, because otherwise capillarity cannot be exhibited effectively and this problem remains even after the temporary ink storage member is fitted in the shaft. Molding is performed in such a manner as to, or as not to, form a clearance with the inner wall when the ink storage is fitted in the shaft. If this clearance is not to be formed, molding should be performed so that this clearance is not formed always when a plurality of products are produced and moreover, the temporary ink storage member does not undergo great deformation when coming into contact with the inner wall of the shaft. When the clearance is to be formed, the clearance must be formed stably as designed, otherwise it results in an unnecessary ink leak. Needless to say, the temporary ink storage member itself is produced with dimensional accuracy as high as possible. When the relation with the shaft is taken into consideration, however, it is preferred to utilize high dimensional accuracy of the portions near the flange portion 1*a* of the shaft 1.

Figure 22:
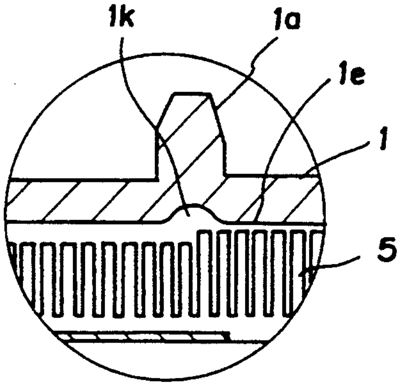
Figure 21:
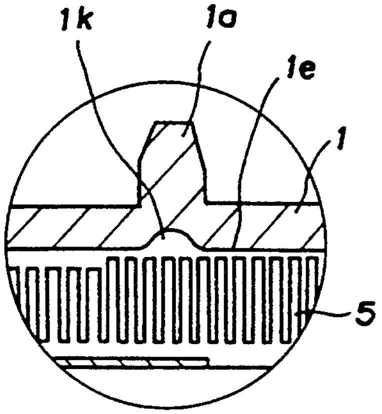

The temporary ink storage member 5 is an example of those temporary ink storage members which form a clearance with the inner wall of the shaft. The present invention takes this clearance into consideration. In other words, as shown in FIG. 21, the recess portion 1*k* is formed in the inner wall 1*e* of the shaft 1 so as to enlarge the clearance at this recess portion 1*k*. In the event that ink leaks along the inner wall 1*e* of the shaft 1, this recess portion 1*k* cuts it off. Here, the clearance is formed preferably so as to become greater either progressively or step-wise toward its front portion. This is from the aspect of capillarity. The diameter of the temporary ink storage member 5 becomes progressively smaller toward its front portion and the storage member 5 has a plurality of stages of diameters. In such a case, too, it is preferred to break such a relation. Needless to say, it is possible to employ the arrangement wherein the step portion of the temporary ink storage member 5 is positioned at the recess portion 1*k* as shown in FIG. 22.

The position of formation of the recess portion 1*k* is at the flange portion 1*a*. This is because cooling is effected by utilizing the flow of the molten resin at the time of molding of the shaft 1 and the recess portion 1*k* can be formed advantageously and naturally when the molded article is withdrawn from the mold.

Figure 23:
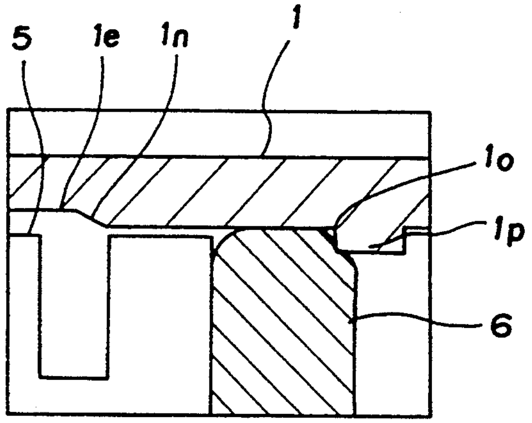
Figure 24:
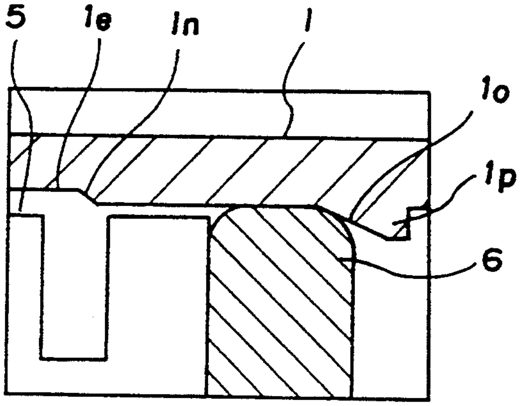
Figure 25:
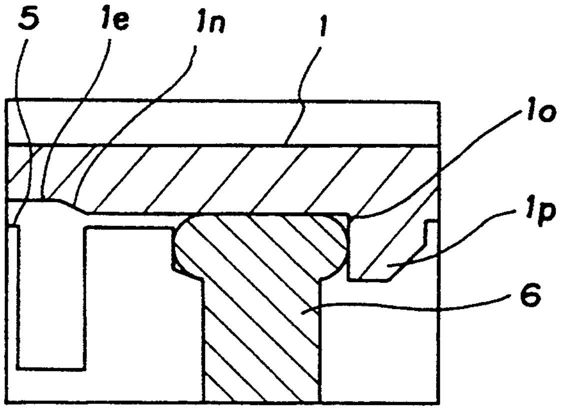

The ring-like elastic member 6 is fitted to this temporary ink storage member 5. The ring-like elastic member 6 changes the communication portion 5 of the temporary ink storage member 5 from a slit shape a through-hole shape. As shown in FIG. 23, the ring-like elastic member 6 is in the close contact and inwardly deformed state with the portion of the inner wall 1*e* which is the reduced diameter inner hole portion between the step portions 1*n* and 1*o* of the shaft 1, and is brought into elastic contact with the step portion 1*o* so that its shoulder portion undergoes deformation.

Such a deformed state functions of course to prevent ink leakage but it also is helpful to prevent any adverse influences of non-uniformity of dimension at the time of molding of the temporary ink storage member 5. In other words, the temporary ink storage member 5 receives clamp force from the tip holder 4 and from the shaft 1 through the ring-like elastic member 6. If this clamp force is too strong, dimensional accuracy of the temporary ink storage member is impeded. Therefore, the ring-like elastic member 6 is brought into contact with the step portion 1*o* so that it undergoes deformation which permits it to deform towards the inner projection portion 1*p* of the inner wall 1*e* of the shaft 1. Such an arrangement is useful even when the writing instrument is not for an automatic drafting machine. However, this arrangement is particularly suitable for this embodiment wherein positioning of the tip holder 4 in the shaft 1 is kept fixed in order to make the length from the flange portion 1*a* of the shaft 1 to the small pipe pen tip 2 stable.

Figure 26:
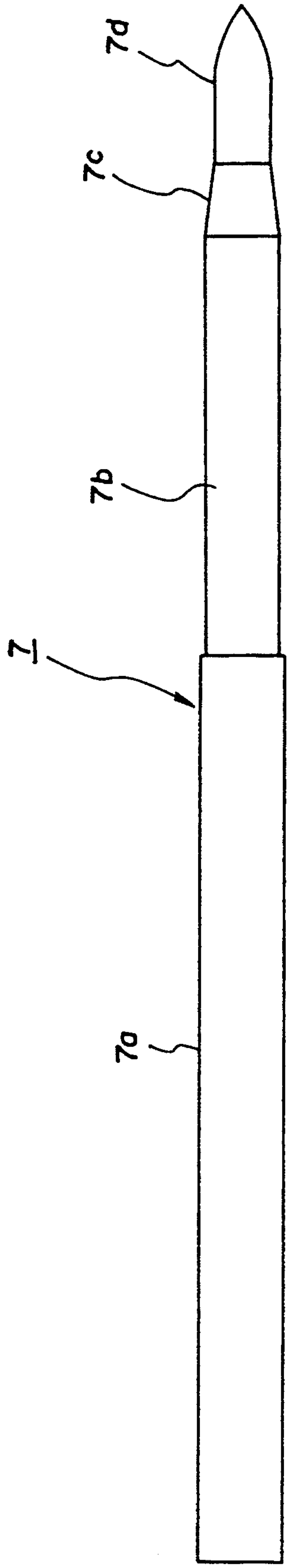

FIG. 26 shows the ink guide member 7. Though the ink guide member 7 may be a suitable injection molded article, the drawing shows particularly a guide member consisting of a fiber bundled article. The guide member 7 includes a large diameter portion 7*a*, a medium diameter portion 7*b*, a taper portion 7*c* and a conical rear end portion 7*d* from its tip end in the order named. The large diameter portion 7*a* has a diameter substantially equal to the diameter of the center hole 5*c* of the temporary ink storage member 5 and permits the communication portions 5*d*, 5*e* to move ink but permit substantially no the passage of air. The medium diameter portion 7*b* forms a clearance between it and the center hole 5*c* of the temporary ink storage member 5 and permits entrance of air from the communication portion 5*f* positioned at the rearmost part. The taper portion 7*c* is supported by the step portion 5*l* at the tip of the fixing portion 5*k* of the temporary ink storage member 5 and the conical rear end portion 7*d* protrudes into the ink tank.

Figure 27:
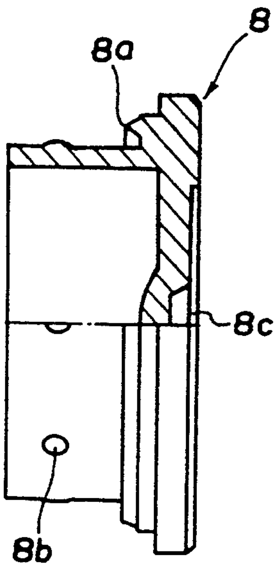
Figure 28:
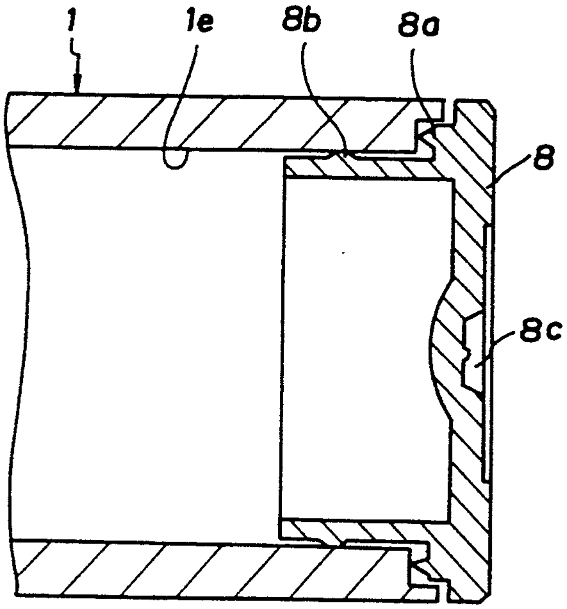
Figure 29:
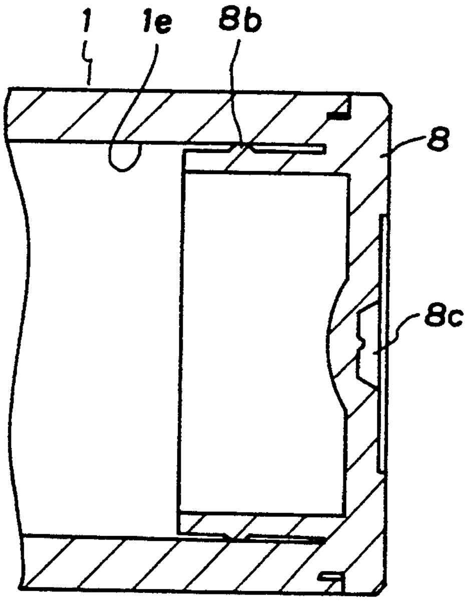

FIG. 27 shows the tail plug 8 as the rearmost component of the main body that has thus been described. The tail plug 8 includes a ring-like portion 8*a* having a pointed head that projects forward, a plurality of convex portions 8*b* and a rear end recess portion 8*c*. This tail plug 8 is fused by ultrasonic welding to the rear end of the shaft 1. As shown in FIGS. 28 and 29, the ring-like portion 8*a* becomes a fused portion and the convex portions 8*b* become the portions which makes the movement of the tail plug 8, into the smooth shaft 1 which advances into the shaft 1 with the progress of fusing of the ring-like portion 8*a*, without shaking while keeping contact with the inner wall 1*e* of the shaft 1. The rear end recess portion 8*c* becomes a portion to which a display sheet for a thickness of the pen, application or the like is attached, whenever necessary.

Figure 30:
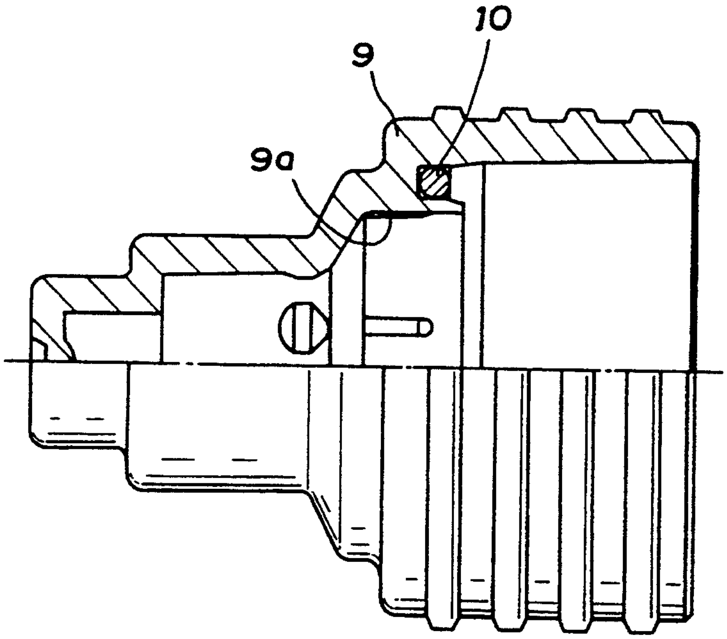

FIG. 30 shows the cap. Ribs 9*a* which function as an insertion guide for the tip holder 4 and also as a reinforcing portion for disposing the ring-like seal member 10 stably are formed radially in the cap main body 9.

Next, another embodiment will be explained with reference to FIGS. 31 to 34. In the following description, like reference numerals will be used to identify like constituent as in the foregoing embodiment.

This embodiment uses a needle member 11, a needle member fitting member 12, a rear projection member 13 extending from the needle member fitting member 12 and a spring 14 instead of the thin rod member 3 and the ink guide core member 7. The shapes of the tip holder 4 and cap main body 9 are somewhat different from those of the foregoing embodiment and a spherical elastic member 15 for sealing the pen tip is disposed inside the cap main body 9.

Figure 32:
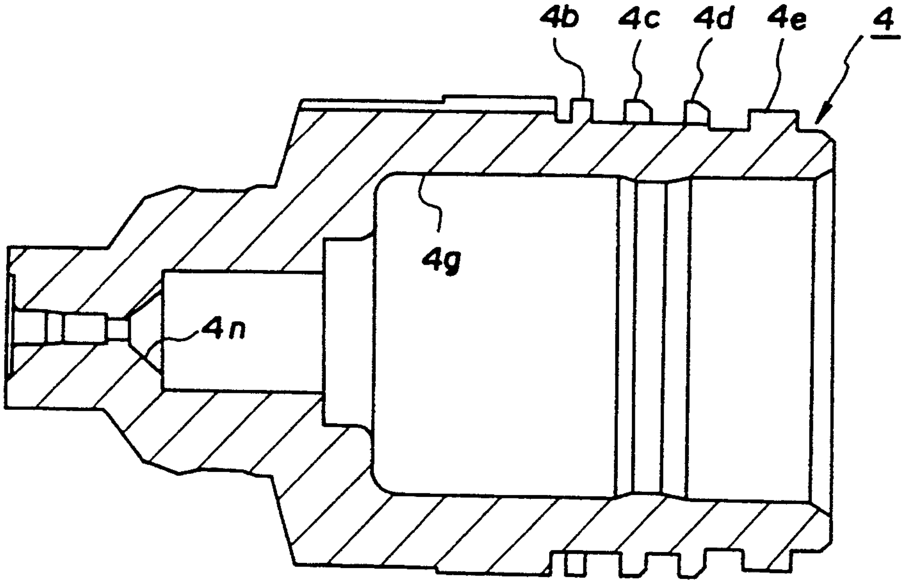

FIG. 32 shows the tip holder 4 of this embodiment. In order to make insertion of the needle member 11 easy at the time of assembly, a tapered hole portion 4*n* is formed in the through-hole 4*g*. The rear end portion of this tapered hole portion 4*n* is a member which limits the advance position of the needle member fitting member 12.

Figure 33:
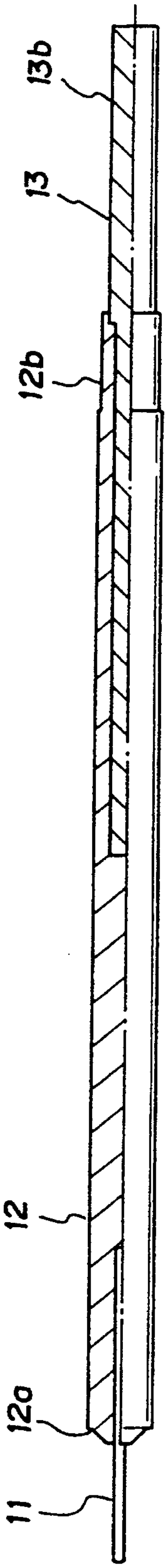

FIG. 33 shows the needle member 11, the needle member fitting member 12 and the rear projection member 13. In other words, the drawing shows a molded needle member article. The needle member 11 is fixed to the needle member fitting member 12 in such a manner as to project from the latter and the needle member fitting member 12 has a step portion 12*a* which comes into contact with the rear end part of the tapered hole portion 4*n* of the tip holder 4. Accordingly, the positional relation of the needle member 11 with respect to the small diameter pen tip 2 can be made stable. A small diameter rear end portion 12*b* is provided so as to secure a clearance for making entrance of air easy from the communication portion 5*f* of the temporary ink storage member 5 in the same way as the medium diameter portion 7*b* of the ink guide core member 7 in the foregoing embodiment. The rear projection member 13 is made of a stainless steel, or the like, and is positioned so that the tip portion of the large diameter rear portion 13a can be buried into the needle member fitting member 12. When the needle member fitting member 12 is as a synthetic resin injection molded article, for example, if such a needle member molded article is produced by so-called "insert molding" by using the needle member 11 and the rear projection member 13 as insert members, the trouble of pressing in the needle member 11 and the rear projection member 13 can be eliminated.

Figure 31:
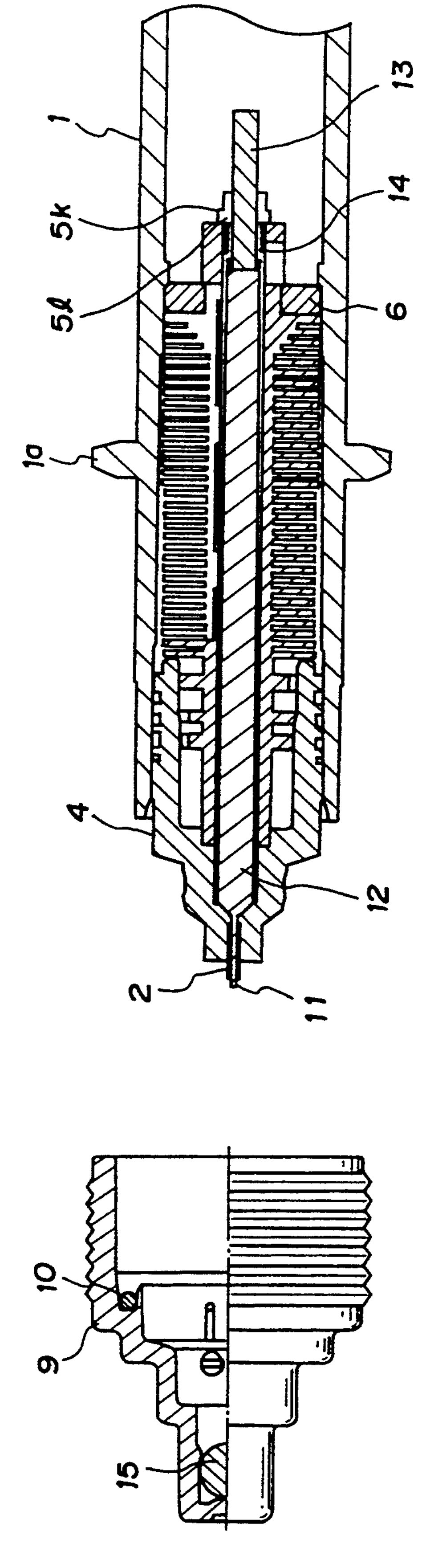
FIG. 31 is a partial exploded longitudinal sectional view and shows another embodiment of the writing instrument in accordance with the present invention.
Figure 34:
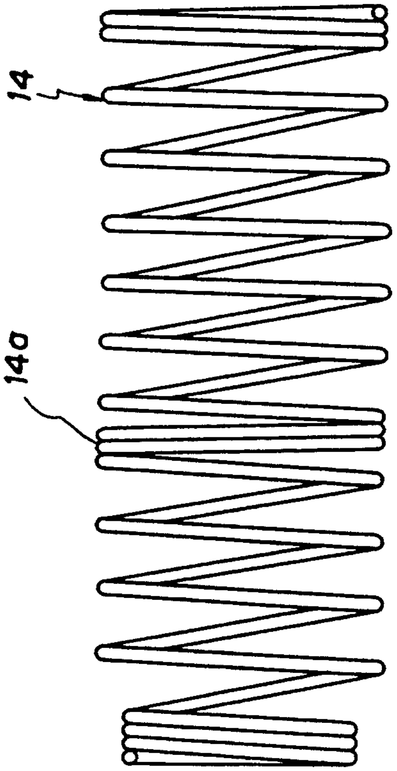

As shown in FIG. 31, the spring 14 is placed at the position of the through-hole 5j portion of the temporary ink storage member 5 and its rearward movement is prevented as it is supported by the step portion 5l which serves as the support portion of the ink guide core member 7 in the foregoing embodiment. Here, the spring 14 is positioned preferably at the back of the communication portion 5f even when the through-hole 5j is not provided. Thus, it does not impede entrance of air. The spring 14 comes into contact with the rear end of the needle member fitting member 12 and biases the needle member molded article forward. FIG. 34 shows this spring 14. A small pitch portion 14a is formed at the center in order to prevent a large number of springs 14 from entangling with one another before assembly when these springs 14 are placed.

The product of this embodiment is a small pipe type writing instrument in the same way as in the foregoing embodiment. As already described, when the writing instrument of the invention is used for an automatic drafting machine, a variety of writing thicknesses are often required as well as different ink colors. If the writing instrument is the small pipe type writing instrument, it can well adapted easily for a variety of writing thicknesses. This embodiment represents of course another embodiment of the writing instrument of the present invention. However, it represents another preferred means for forming a group of products. In other words, when the writing instrument is for the automatic drafting machine, requirements from the application field such as whether the writing surface is paper or film are often posed. In such a case, ink having different properties is used generally, though the ink color and the writing thickness are the same, and an ink discharge structure and its accompanying structure may become different. However, the number of components to be prepared is preferably as small as possible so that the product can be produced efficiently. Therefore, the shaft 1 and the temporary ink storage member 5 are the common components to the foregoing embodiment. It is easy to use the shaft 1 and the temporary ink storage member 5 of the foregoing embodiment 10 exclusively for paper use and those of this embodiment, exclusively for film use.

The shapes of the tip holder 4 and cap main body 9 are somewhat changed not only due to the structural requirement described above but in order to prevent erroneous fitting. In other words, when a product group is produced, the cap main body 9 of the foregoing embodiment can be fitted selectively to the tip holder 4 of the foregoing embodiment and the cap main body 9 of this embodiment can be fitted selectively to the tip holder 4 of this embodiment. When the cap main body 9 is of the type which is fitted to the shaft but not to the tip holder, too, such selectivity is provided preferably to the cap.

Requirements for ink colors, writing thickness and writing surface are diversified and these diversified requirements are imposed on the product group. Therefore, users cannot easily distinguish them. For, at first look, appearance and shape seem analogous and the writing thickness and difference in small tube pen tip diameter cannot be visually distinguished easily. Furthermore, ink colors cannot be distinguished so easily generally in the case of the ink-free type writing instruments, not only the color distinction between similar colors such as yellow and orange, for example.

Accordingly, a display for making such distinction easy is desirable. The sheet which is to be bonded to the tail plug 8 described already is such an example. The present invention provides a suitable instrument from the aspect of such a display, too.

The members that are utilized for this purpose are the shaft 1, the tip holder 4, the temporary ink storage member 5 and the cap main body 9. To begin with, the shaft 1 is made of a transparent material so that the tip holder 4 and the temporary ink storage member 5 can be seen therethrough. Polypropylene described already satisfies this requirement for transparency. Since only the tip holder 4 and the temporary ink storage member 5 need be seen through, the degree of transparency and color tone are arbitrary. Since the temporary ink storage member 5 comes into contact with ink, it is used as an ink color display member. When injection molding is carried out using an ABS resin, for example, a colorant of the ink color may be used conjointly, and for an easier alternative, the temporary ink storage member 5 may be dipped in the desired color ink, then withdrawn therefrom and dried. In this manner, it comes to possess the color corresponding to the ink color. As to the display of the writing thickness and the display of application, it is preferable that the cap main body 9 be common irrespective of the writing thickness and in order to clarify the selectivity described above, the cap main body 9 is also preferably used as the application display member. In other words, the cap main body 9 may be colored in different colors in accordance with applications. This also holds true of the case where only the writing instrument of the first embodiment or the second embodiment is produced as the product group. However, the cap main body 9 should not conceal the displays of tip holder 4 and temporary ink storage member 5 when it is fitted. The cap main body 9 shown in the drawing leaves the rear part of the tip holder 4 exposed even when it is fitted. Incidentally, there can be a case where the ring-like seal member 10 is not used in the cap. Therefore, the cap rather than the cap main body 9 can be used as the application display member. The tip holder 4 can therefore used as the writing thickness display member. If it is colored in blue for 0.70 mm and yellow for 0.35 mm in accordance with the international ISO standards, the tip holder 4 has high versatility.

Figure 35:
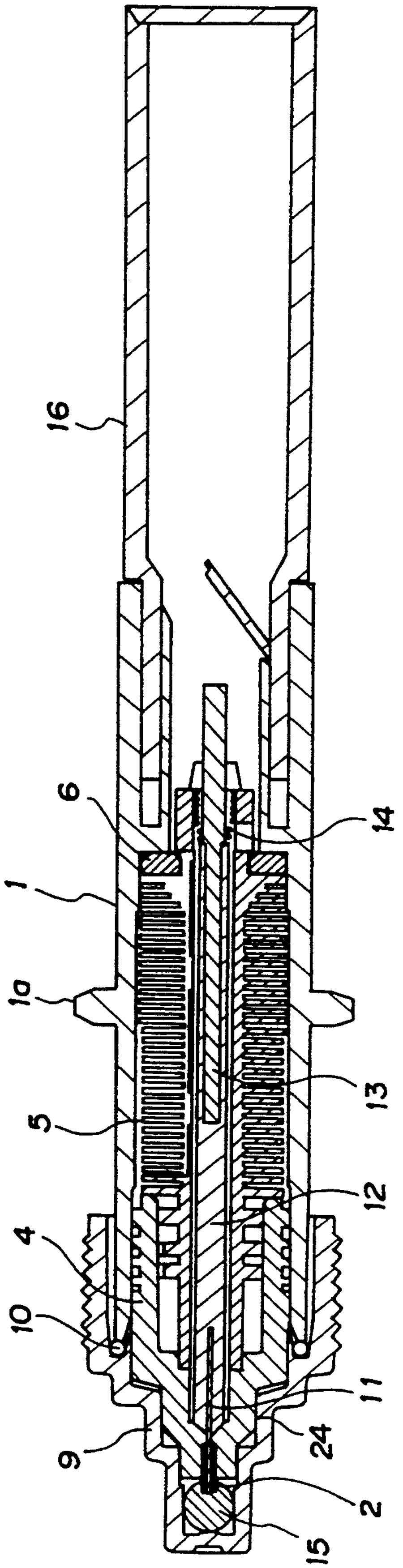
FIG. 35 is a longitudinal sectional view of still another embodiment of the writing instrument in accordance with the present invention.
Figure 36:
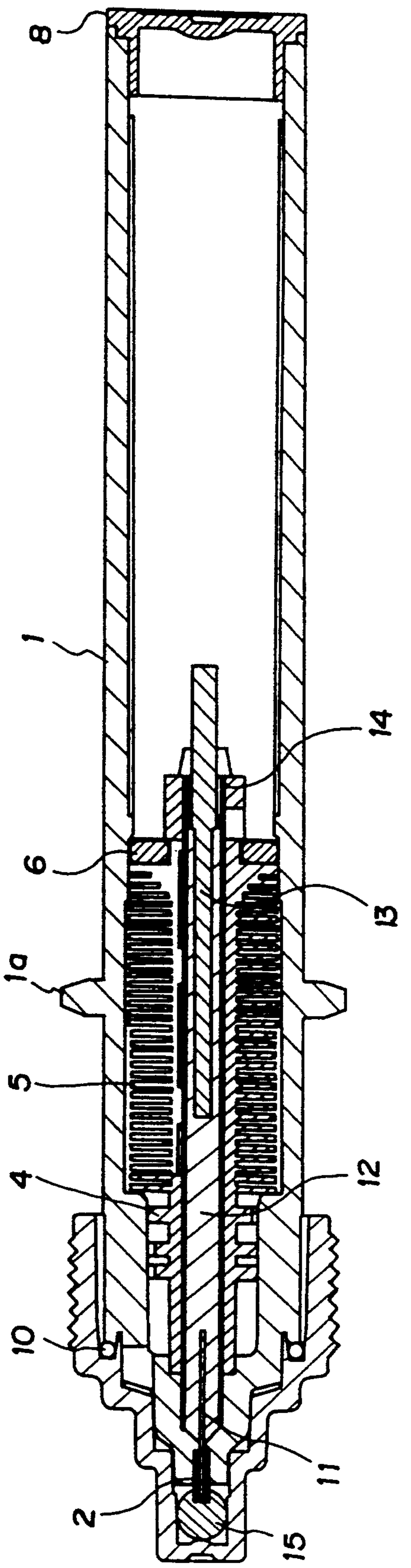
FIG. 36 is a longitudinal sectional view and shows still another embodiment of the writing instrument in accordance with the present invention.

Although the present invention has thus been described with reference to the two embodiments, various changes and modifications can be made without departing from the gist of the invention. For example, the number of flange portions can be chosen in relation with the apparatus used and if a plurality of flange portions are used, one of them may correspond to the flange portion 1a described already. Though the temporary ink storage member shown in the drawing has a temporary ink storage groove 5a having a combtooth-like longitudinal section, various other known types can also be used. Printing can be placed on the shaft and a reinforcing metal ring for fixing the pen tip can be fitted to the tip holder. The inner hole of the shaft need not be used as the ink tank but pen may have a removable ink tank which is fitted thereto, and the tip holder and the shaft may be integral with each other. In other words, suitable members can be shaped suitably as separate members or may be accessorial to the others or may be shaped into a plurality of separate members. FIG. 35 shows an example which uses a removable ink tank 16 and FIG. 36 shows an example where the shaft and the tip holder are shaped as one component. The writing instrument of the invention may be a ball-point pen as another kind of writing instrument.

What is claimed is:

1. A writing instrument for a plotter, comprising:

a hollow shaft of a synthetic resin and having a longitudinal axis;

a pen tip holder injection molded of a synthetic resin and fitted into and fixed to a forward end of said shaft and having mounted therein a pen tip projecting forward therefrom along said longitudinal axis, and an ink tank at a rear end portion of said shaft;

an injection molded temporary ink storage member made of a synthetic resin and non-threadedly housed in said shaft between said pen tip and said ink tank; and a mounting means on said hollow shaft consisting of a non-threaded flange portion integral with said shaft and positioned around the outer peripheral portion of said shaft at a position corresponding to said temporary ink storage member within said shaft, said flange portion extending radially outwardly from the outermost peripheral portion of said shaft and having two spaced radial surfaces for being engaged by the plotter in non-threaded engagement for mounting said writing instrument on the plotter, said surfaces having a radial dimension and being spaced for being firmly non-threadedly engaged between and held fixedly in the direction of the longitudinal axis by mounting pawls on the plotter, whereby the writing instrument can be mounted without the necessity for adjustment of its position in the direction of the longitudinal axis;

said synthetic resin of said shaft being softer than said synthetic resin of said pen tip holder.

2. A writing instrument as claimed in claim 1 wherein said shaft is made of polypropylene and said pen tip holder is made of polyacetal.

3. A writing instrument as claimed in claim 1 wherein said forward end of said shaft has a front fixing portion having a shape for gripping said pen tip holder with a relatively great gripping force and a rear fixing portion having a shape for gripping said pen tip holder with a relatively small gripping force.

4. A writing instrument as claimed in claim 1, wherein said hollow shaft has an annular recess formed in an inner periphery thereof in radial alignment with said flange portion.

5. A writing instrument as claimed in claim 1, wherein said flange portion has a radially extending circumferential groove formed therein.

6. A writing instrument as claimed in claim 1, wherein said flange has an axially extending annular groove formed in each of said radial surfaces thereof.

7. A writing instrument as claimed in claim 6, wherein said annular grooves are formed at radially innermost portions of said radial surfaces, respectively.

8. A writing instrument for a plotter, comprising:

a hollow shaft of a synthetic resin and having a longitudinal axis;

a pen tip at a forward end of said shaft and concentric with said longitudinal axis and an ink tank at a rear end portion of said shaft;

an injection molded temporary ink storage member made of a synthetic resin and non-threadedly housed in said shaft between said pen tip and said ink tank;

a mounting means on said hollow shaft consisting of a non-threaded flange portion integral with said shaft and positioned around the outer peripheral portion of said shaft at a position corresponding to said temporary ink storage member within said shaft, said flange portion extending radially outwardly from the outermost peripheral portion of said shaft and having two spaced radial surfaces for being engaged by the plotter in non-threaded engagement for mounting said writing instrument on the plotter, said surfaces having a radial dimension and being spaced for being firmly non-threadedly engaged between and held fixedly in the direction of the longitudinal axis by mounting pawls on the plotter, whereby the writing instrument can be mounted without the necessity for adjustment of its position in the direction of the longitudinal axis; and wherein said hollow shaft has an annular recess formed in an inner peripheral thereof in radial alignment with said flange portion.

9. A writing instrument for a plotter, comprising:

a hollow shaft of a synthetic resin and having a longitudinal axis;

a pen tip at a forward end of said shaft and concentric with said longitudinal axis and an ink tank at a rear end portion of said shaft;

an injection molded temporary ink storage member made of a synthetic resin and non-threadedly housed in said shaft between said pen tip and said ink tank;

a mounting means on said hollow shaft consisting of a non-threaded flange portion integral with said shaft and positioned around the outer peripheral portion of said shaft at a position corresponding to said temporary ink storage member within said shaft, said flange portion extending radially outwardly from the outermost peripheral portion of said shaft and having two spaced radial surfaces for being engaged by the plotter in non-threaded engagement for mounting said writing instrument on the plotter, said surfaces having a radial dimension and being spaced for being firmly non-threadedly engaged between and held fixedly in the direction of the longitudinal axis by mounting pawls on the plotter, whereby the writing instrument can be mounted without the necessity for adjustment of its position in the direction of the longitudinal axis;

wherein said flange has an axially extending annular groove formed in each of said radial surfaces thereof; and wherein said annular grooves are formed at radially innermost portions of said radial surfaces, respectively.

* * * * *